(12) United States Patent
Schmidt

(10) Patent No.: US 6,995,942 B2
(45) Date of Patent: Feb. 7, 2006

(54) SYSTEMS FOR WORF IMPROVEMENT

(75) Inventor: Thorsten Schmidt, Milpitas, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 99 days.

(21) Appl. No.: 10/818,744

(22) Filed: Apr. 6, 2004

(65) Prior Publication Data

US 2005/0237660 A1    Oct. 27, 2005

Related U.S. Application Data

(63) Continuation of application No. 10/621,068, filed on Jul. 16, 2003, now abandoned.

(60) Provisional application No. 60/437,111, filed on Dec. 30, 2002.

(51) Int. Cl.
*G11B 5/596* (2006.01)
*G11B 5/09* (2006.01)

(52) U.S. Cl. .................. 360/77.04; 360/48; 360/77.08

(58) Field of Classification Search .................. None
See application file for complete search history.

(56) References Cited

U.S. PATENT DOCUMENTS

| | | | |
|---|---|---|---|
| 5,107,378 A | 4/1992 | Cronch et al. ............... 360/45 |
| 5,966,264 A | 10/1999 | Belser et al. ............ 360/77.08 |
| 6,023,389 A | 2/2000 | Cunningham ................ 360/75 |
| 6,025,970 A | 2/2000 | Cheung ................... 360/77.08 |
| 6,411,459 B1 | 6/2002 | Belser et al. ................ 360/75 |
| 6,445,521 B1 | 9/2002 | Schaff et al. ................ 360/31 |
| 6,493,173 B1 * | 12/2002 | Kim et al. ............... 360/77.04 |
| 2001/0036033 A1 * | 11/2001 | Baumann et al. ........ 360/77.08 |
| 2002/0135927 A1 | 9/2002 | Yatsu |
| 2003/0112545 A1 * | 6/2003 | Hanson et al. ........... 360/77.04 |
| 2003/0161061 A1 | 8/2003 | Lamberts |

FOREIGN PATENT DOCUMENTS

| | | |
|---|---|---|
| JP | 61211814 | 9/1986 |
| JP | 63025803 | 2/1988 |
| JP | 10334402 | 12/1998 |

* cited by examiner

*Primary Examiner*—Andrew L. Sniezek
(74) *Attorney, Agent, or Firm*—Fliesler Meyer LLP

(57) ABSTRACT

Wedge Offset Reduction Field (WORF) data can be used to reduce the effective written-in runout of a servo pattern. In order to prevent the WORF data from being applied to an improper portion of the servo pattern, the identification of a quadrant associated with that WORF data can be stored with the WORF data. For example, the servo pattern of a hard disk can contain a number of servo burst boundaries. In order to ensure that the WORF data is applied to the proper burst boundary, the identity of a quadrant associated with that boundary can be written into the servo wedge along with the WORF data. This description is not intended to be a complete description of, or limit the scope of, the invention. Other features, aspects, and objects of the invention can be obtained from a review of the specification, the figures, and the claims.

12 Claims, 9 Drawing Sheets

SYSTEMS FOR WORF IMPROVEMENT

CLAIM OF PRIORITY

This application is a continuation of U.S. patent application Ser. No. 10/621,068, filed Jul. 16, 2003 now abandoned, which claims benefit from U.S. Provisional Patent Application No. 60/437,111, filed Dec. 30, 2002, both of which incorporated herein by reference.

CROSS-REFERENCE TO RELATED APPLICATIONS

The following applications are cross-referenced and incorporated herein by reference:

U.S. Provisional Patent Application No. 60/437,108 entitled "Methods for WORF Improvement," by Thorsten Schmidt, filed Dec. 30, 2002.

U.S. patent application Ser. No. 10/620,679 entitled "Methods for WORF Improvement," by Thorsten Schmidt, filed Jul. 16, 2003.

U.S. patent application Ser. No. 10/818,745 entitled "Methods for WORF Improvement," by Thorsten Schmidt, filed Apr. 5, 2004.

U.S. Provisional Patent Application No. 60/436,712 entitled "Systems for Self-Servowriting Using Write-Current Variation," by Richard M. Ehrlich, filed Dec. 27, 2002.

U.S. Provisional Patent Application No. 60/436,703 entitled "Methods for Self-Servowriting Using Write-Current Variation," by Richard M. Ehrlich, filed Dec. 27, 2002.

U.S. patent application Ser. No. 10/420,076 entitled "Systems for Self-Servowriting Using Write-Current Variation," by Richard M. Ehrlich, filed Apr. 22, 2003.

U.S. patent application Ser. No. 10/420,498 entitled "Methods for Self-Servowriting Using Write-Current Variation," by Richard M. Ehrlich, filed Apr. 22, 2003.

U.S. patent application Ser. No. 10/818,473 entitled "Systems for Self-Servowriting Using Write-Current Variation," by Richard M. Ehrlich, filed Apr. 5, 2004.

U.S. patent application Ser. No. 10/818,174 entitled "Methods for Self-Servowriting Using Write-Current Variation," by Richard M. Ehrlich, filed Apr. 5, 2004.

U.S. Provisional Patent Application No. 60/436,709 entitled "Systems for Multi-Pass Self-Servowriting," by Richard M. Ehrlich, filed Dec. 27, 2002.

U.S. Provisional Patent Application No. 60/436,743 entitled "Methods for Multi-Pass Self-Servowriting," by Richard M. Ehrlich, filed Dec. 27, 2002.

U.S. patent application Ser. No. 10/420,452 entitled "Systems for Self-Servowriting With Multiple Passes Per Servowriting Step," by Richard M. Ehrlich, filed Apr. 22, 2003.

U.S. patent application Ser. No. 10/420,127 entitled "Methods for Self-Servowriting With Multiple Passes Per Servowriting Step," by Richard M. Ehrlich, filed Apr. 22, 2003.

U.S. patent application Ser. No. 10/818,181 entitled "Systems for Self-Servowriting With Multiple Passes Per Servowriting Step," by Richard M. Ehrlick, filed Apr. 5, 2004.

U.S. patent application Ser. No. 10/818,185 entitled "Methods for Self-Servowriting With Multiple Passes Per Servowriting Step," by Richard M. Ehrlich, filed Apr. 5, 2004.

FIELD OF THE INVENTION

The present invention relates to the ability to read and write data on rotatable storage media.

BACKGROUND

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. Thinner data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

BRIEF SUMMARY

Systems and methods in accordance with the present invention take advantage of quadrant information when using misplacement information. Misplacement information can be used to account for variations in a positioning pattern on a rotating medium. For example, in a hard disk drive utilizing WORF information for a given servo burst boundary, the identity of a quadrant associated with the WORF value can be stored in addition to the WORF information. As a servo wedge contains a number of servo burst pairs, and there is some uncertainty in positioning a head relative to the burst pairs, it is possible for a head reading the WORF data to apply it to an incorrect boundary. The storing of quadrant information along with the WORF data can reduce the effective written-in runout, as an offset will not be applied to an incorrect boundary. An improper application of offset could result in tracking problems and errors during the reading and writing of data.

Other features, aspects, and objects of the invention can be obtained from a review of the specification, the figures, and the claims.

DETAILED DESCRIPTION

Figure 1:
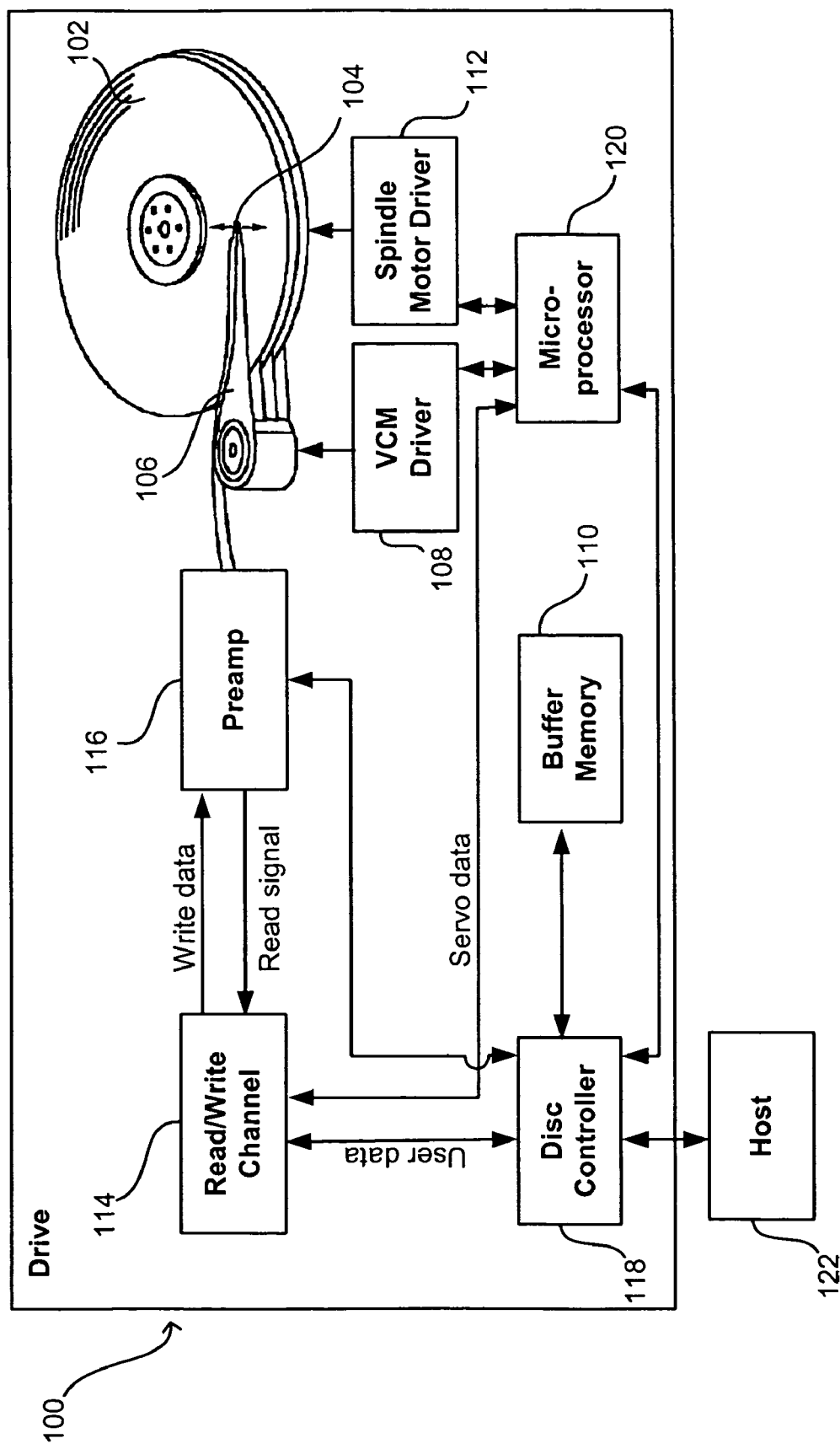
FIG. 1 is a diagram showing components of a disk drive that can be used in accordance with embodiments of the present invention.

Systems and methods in accordance with one embodiment of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor 108 to drive the actuator arm, a spindle motor 112 to rotate the disk(s), a servo controller 110 to control the motors, and a disk controller 118 to accept information from a host 122 to provide to the servo controller. A host can be any device, apparatus, or system capable of utilizing the data storage device, such as a personal computer or Web server. The drive can contain at least one processor, or microprocessor 120, that can process information for at least one of the disk controller 118 and servo controller 110. The disk controller 118 can also provide user data to a read/write channel 114, which can send data signals to a current amplifier or preamp 116 to be written to the disk(s) 102, and can send servo signals to the servo controller 110.

Figure 2:
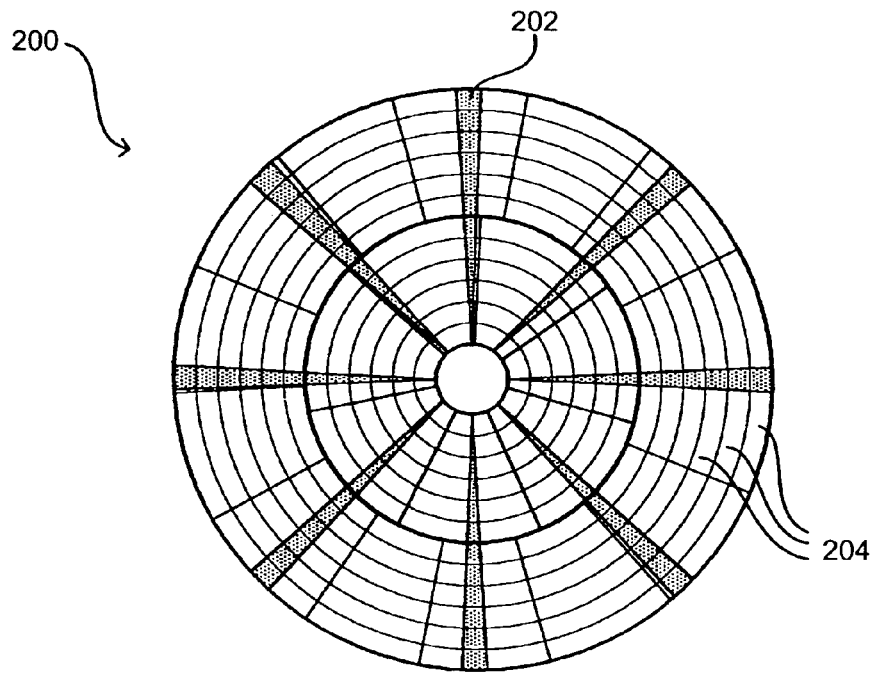
FIG. 2 is a diagram showing a typical pattern that can be written to a disc in the drive of FIG. 1.

The information stored on such a disk can be written in concentric tracks, extending from near the inner diameter of the disk to near the outer diameter of the disk 200, as shown in the example disk of FIG. 2. In an embedded servo-type system, servo information can be written in a servo wedge 202, and can be recorded on tracks 204 that can also contain data 206. In a system where the actuator arm rotates about a pivot point such as a bearing, the servo wedges may not extend linearly from ID to OD, but may be curved slightly in order to adjust for the trajectory of the head as it sweeps across the disk.

The servo information often includes bursts of transitions called "servo bursts." The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. The position of a head or element, such as a read/write head or element, relative to the center of a target track, will be referred to herein as a position-error signal (PES).

Figure 3:
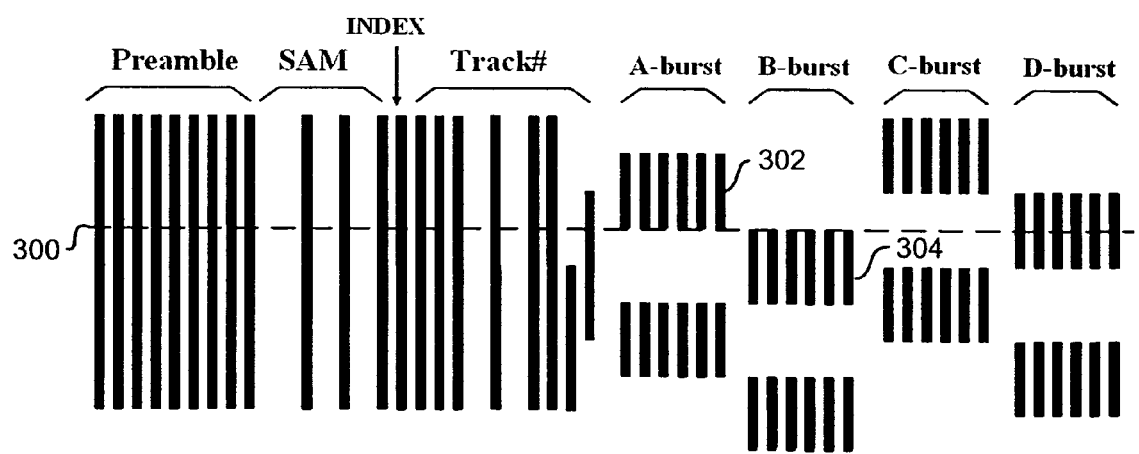
FIG. 3 is a diagram showing servo information that can be written to the tracks shown in FIG. 2.

For example, a centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk. It should be understood that the pattern of FIG. 3 is exemplary, and that many patterns can be used equally as well and can also take advantage of embodiments of the present invention.

The PES scheme described above is one of many possible schemes for combining the track number read from a servo wedge and the phases or amplitudes of the servo bursts. Many other schemes are possible that can benefit from embodiments in accordance with the present invention.

A problem that exists in the reading and writing of servo patterns involves the misplacement, or offset, of a read/write head with respect to the ideal and/or actual position of a track. It is impossible to perfectly position a head with respect to a track for each rotation of a disk, as there is almost always a noticeable offset between the desired position and the actual position of the head with respect to the disk. This can cause problems when writing servo patterns, as each portion of the pattern can be slightly misplaced. This can lead to what is referred to as written-in runout. Written-in runout can be thought of as the offset between the "actual" centerline, or desired radial center, of a track and the centerline that would be determined by a head reading the written servo pattern. Written-in runout can lead to servo performance problems, wasted space on a disk and, in a worst case, unrecoverable or irreparably damaged data.

It is possible using various methods, known to those of ordinary skill in the art, to determine the distance between the desired track centerline (either a read track centerline or write track centerline), having effectively removed at least a portion of the synchronous runout, and the apparent centerline obtained from demodulating the burst pattern. Examples of such methods can be found in U.S. Pat. No. 6,097,565 to Sri-Jayantha et al., entitled: "Repeatable runout free servo architecture in direct access storage device;" U.S. Pat. No. 6,061,200 to Shepherd et al., entitled "In-drive correction of servo pattern errors;" U.S. Pat. No. 5,978,169 to Woods et al., entitled "Repeated servo runout error compensation in a disc drive;" and U.S. Pat. No. 6,310,742 to Nazarian et al., entitled "Repeatable runout cancellation in sectored servo disk drive positioning system."

This determined distance can be stored in the servo wedges for a track, such as after the servo bursts, and will be referred to herein as Wedge Offset Reduction Field (WORF) data. WORF data can be, for example, a digital number placed after a servo wedge on a given track that includes an amount that should be added to, or subtracted from, the PES value for that wedge obtained from demodulating the bursts. Alternatively, WORF data can also be stored in memory such as SRAM, DRAM, or flash. A WORF value can be determined, for example, by observing a track over at least one revolution, if not several revolutions of the disk and combining the observed position information with the servo loop characteristics, which may, for example, be modeled, measured, or estimated. As an example, the observed position information could be synchronously averaged to determine the synchronous runout and combined with the servo loop characteristics. This information can be used to determine the misplacement of the burst edges used to determine a track centerline, for example. The servo can read the WORF value, add the value to the computed PES, and presumably follow a more accurate track. For instance, if a read/write head passes over a pair of servo bursts and determines a PES of +0.2, but it has been determined that the bursts are slightly misplaced and should have given a reading of −0.1 for that position of the read/write head, a −0.3 factor can be stored as WORF data at the end of the servo data such that the head knows to adjust the PES value by the WORF value.

The use of WORF information can cause problems, however, if for a particular wedge the set of bursts used to compute PES, and to which the WORF value is added, is different than the set of bursts used to calculate the WORF value. Applying an offset to this incorrect set of bursts could be enough to cause the head move by an amount that causes the head to read data from, or write data to, an adjacent track. It can also generally cause write and read faults which are occurrences in which the drive determines that the head is far enough from the center of the track that the transfer should be stopped. This can reduce the performance of the drive. Although the situation of using inconsistent WORF and burst sets can occur at any target position, it is more likely to occur when the target position is in the proximity of a boundary between two burst sets, or two quadrants.

Systems and methods in accordance with one embodiment of the present invention addresses the problem of applying WORF values to improper servo burst pairs by combining quadrant position information with the WORF information stored in a servo wedge. For example, the non-repeatable runout (NRRO) suffered by a read/write (R/W) head during self-servowriting can be written into the servo bursts. This can cause each servo burst to be misplaced relative to the desired centerline of a track. A similar problem can occur during servo write and media write processes.

For example, it can be seen in FIG. 3 that the centerline of a track 300 is defined by a series of A-B burst pairs, where for each pair the bottom edge of the A-burst 302 and the top edge of the B-burst 304 are used to define the centerline position. This can be referred to as an A-burst/B-burst boundary, designating that the bottom edge of the A-burst and the top edge of the B-burst are to be used to define the centerline position.

Due to irregularities in the disk and in the writing mechanism, for example, each burst pair can be misplaced relative to the desired or optimal position. One way to account for the misplacement of the complimentary edges of each burst pair, or burst boundary, is to determine the "average" location of the burst boundaries, or to determine an improved centerline by examining the burst pairs over at least one revolution of the disk, then determining how far each burst pair is from the location of the center of the improved track. This information distance, or WORF data, can be stored such as by writing to the track or storing in memory.

Figure 4:
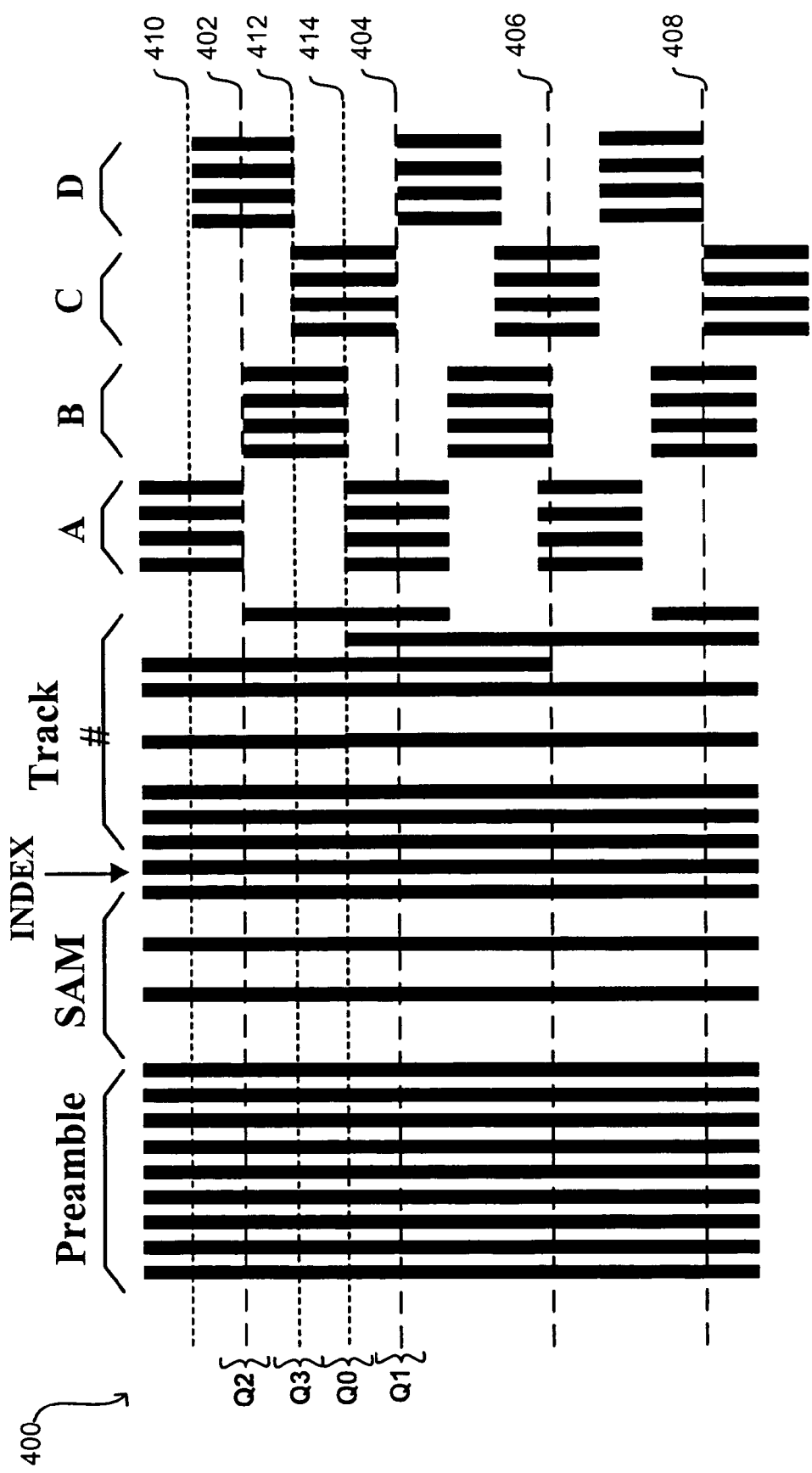
FIG. 4 is a diagram of a servo pattern that can be used with the drive of FIG. 1.

In the section of exemplary servo information 400 shown in FIG. 4, there are four data track centerlines shown 402, 404, 406, and 408. While the majority of the track centerlines are positioned approximately along the companion edges or boundaries of the appropriate servo bursts, it can be seen that the A-burst for track centerline 406 is misplaced by an appreciable amount. For this wedge of the data track, the PES signal would give a reading that would cause a R/W head to be positioned above the desired head position for the track. For such a track, WORF data can be added to the servo information in this servo wedge to account for the misplacement.

In the servo pattern 400 of FIG. 4, it can be seen that there is a data track centerline for every third burst boundary. For example, data track centerline 402 is defined by an A-burst/B-burst boundary. The next boundary 412 down in the Figure is defined by a D-burst/C-burst boundary, with the following boundary 414 defined by a B-burst/A-burst boundary. These boundary lines can be referred to as burst lines. When the synchronous or repeatable runout is removed from the pattern, it is possible that the desired track center position passes closer to one of the adjacent boundaries than the "intended" boundary. For example, when the servo pattern was written, it was intended that the position of data track centerline 402 be defined by the A-burst/B-burst boundary. It is possible, however, that once the repeatable runout is accounted for, such as may be due to eccentricities or other characteristics of the disk, the "corrected" data track centerline would pass closer to either the C-burst/D-burst boundary defining line 410, or the D-burst/C-burst boundary defining line 412. In such a case, it would be improper to apply a WORF adjustment to the PES signal obtained from one of those boundary burst pairs that was calculated for the A-burst/B-burst boundary.

One approach to using WORF values in such a situation utilizes the concept of servo quadrants. A servo quadrant is defined herein to represent a radial area that is a portion, or radial subdivision, of a burst cycle. A quadrant can be thought of as a radial extent over which the fractional servo position error signal is a given function of the bursts. For example, the radial position error signal (PES) can be determined by combining the track number and a function of the bursts. The function used can depend upon the radial location and the values of the bursts. The region over which the function is the same is defined as a quadrant.

Quadrants can repeat as often as the servo pattern. In some patterns, a quadrant can be that area, along a data track, that is closest to a given servo burst boundary. The term quadrant is used in the industry to refer to any such radial area, regardless of the servo pattern. This means that the term "quadrant" is used as a broad, generic term that can include, for example, sextants and octants. When a quadrant is referred to herein, it should be understood that the reference is not limited to a four-burst pattern.

For example, in FIG. 4 quadrant zero (Q0) is the area of the servo pattern for which line 414 defined by the B-burst/A-burst boundary is closer than the line defined by any other boundary. The fractional PES for this quadrant would be defined by the amplitude given by the A-burst minus the amplitude given by the B-burst, which could be designated as A-B. The fractional PES can then be multiplied by an appropriate gain constant. Quadrant one (Q1) is the area that is closest to line 404, defined by the C-burst/D-burst boundary, which would give a PES value of D-C or -(C-D).

Quadrant two (Q2) is closest to line 402 defined by the A-burst/B-burst boundary (PES of B-A or -(A-B)), and quadrant three (Q3) is closest to line 412 defined by the D-burst/C-burst boundary (PES of C-D). There is also a quadrant one closest to line 410 (also a PES of D-C or -(C-D)). It should be understood that the concept of quadrants is exemplary, and can be extended to other servo patterns or to any PES schemes that use more or less than four different combinations of burst values to determine the fractional PES.

Using the concept of quadrants in this example, it is possible to store the quadrant information along with the WORF data. For example, a WORF field can include both a misplacement adjustment for a burst boundary and the quadrant associated with that burst boundary. The servo system can then determine that the WORF field should be used only if the servo uses the matching quadrant. In another embodiment, WORF values for the adjacent quadrants can also be written to the disk or stored in memory, such that if the trajectory of the head takes it to one of these quadrants, a proper adjustment can be made. If WORF information is not stored for these adjacent quadrants, then a drive can decide to simply not apply a WORF adjustment, or can decide to not read or write for that revolution of the disk. The drive can then return to the data track at a later time, or, if writing data, can decide to no longer use that track or data sector. In another embodiment, the drive can force the position algorithm to use the burst set associated with the WORF value. There may be various other ways to use the quadrant information written with the WORF value. Referring again to FIG. 1, the WORF information could be read and included in the read signal sent from the head 104 through the read/write channel 114 and, after being processed by the microprocessor 120, ultimately sent to the servo controller 110 as servo data to be used in driving the actuator arm 106 to position the head 104.

Figure 5:
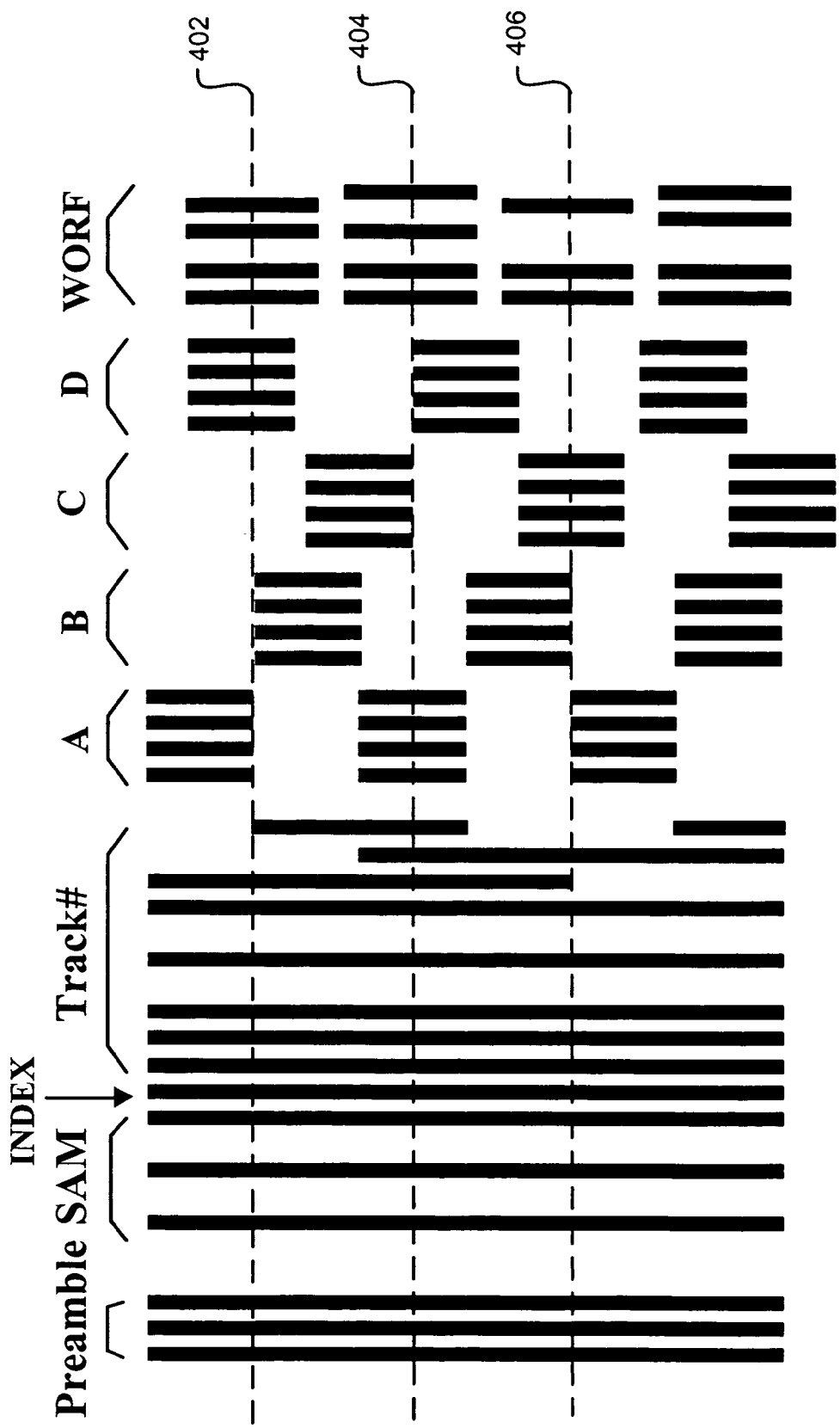
FIG. 5 is a diagram of a servo pattern containing WORF data in accordance with one embodiment of the present invention.

An example of WORF data being added to a servo pattern is shown in FIG. 5. Taking the pattern of FIG. 4, WORF information is added for each data track corresponding to centerlines 402, 404, and 406. In the pattern shown, the servo information is "trimmed" or partially overwritten on subsequent passes of a write head, such that the width of each track of servo information is thinner than the width of information otherwise written by the write head. As shown in FIG. 5, the width of WORF data can as large as the width of the data track, but is typically somewhat less wide than the data track. In the Figure, it can be seen that there is a preamble, or sync mark, at the beginning of the WORF field. The WORF preamble is exemplary and may not be necessary. It can be seen, then, that it would be possible to read an adjacent or "incorrect" boundary and still read a WORF value intended for another boundary. A WORF value can be recorded for the position of a head when writing the track, the position of a head when reading the track, or both. Each WORF value may include, for example, a preamble and at least one data value.

Figure 6:
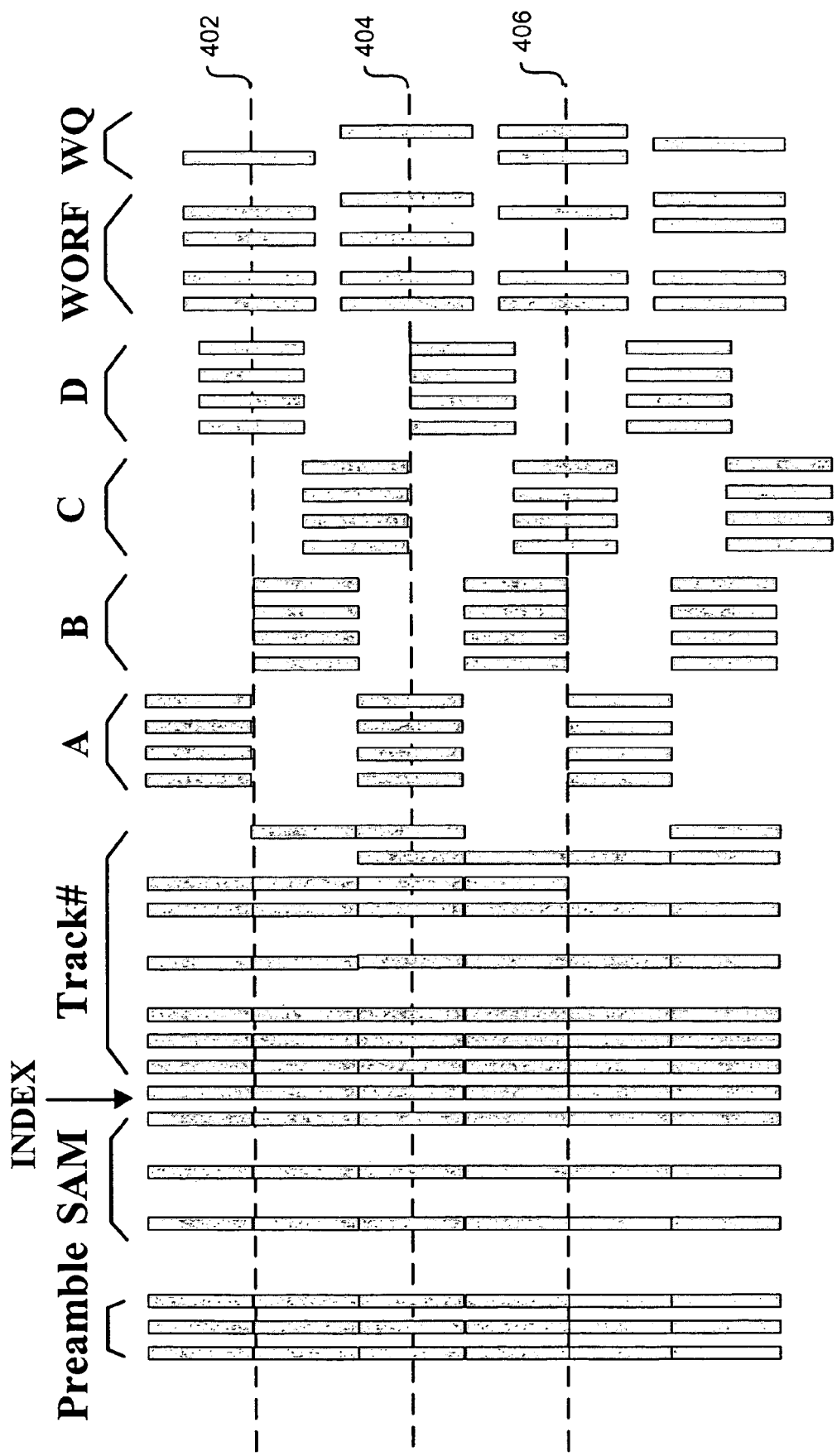
FIG. 6 is a diagram of a servo pattern containing WORF data and quadrant information in accordance with one embodiment of the present invention.

FIG. 6 shows an example in which quadrant information has been added to the WORF information for each data track. In addition to the WORF data, another section of information (WQ) is added to designate the quadrant, or WORF Quadrant, for which the WORF value was calculated. While the WQ information is shown at the end of the servo information for that wedge/track, it should be understood that the quadrant information can be placed at any available location in the wedge, outside the wedge, or could be incorporated with other information.

Figure 7:
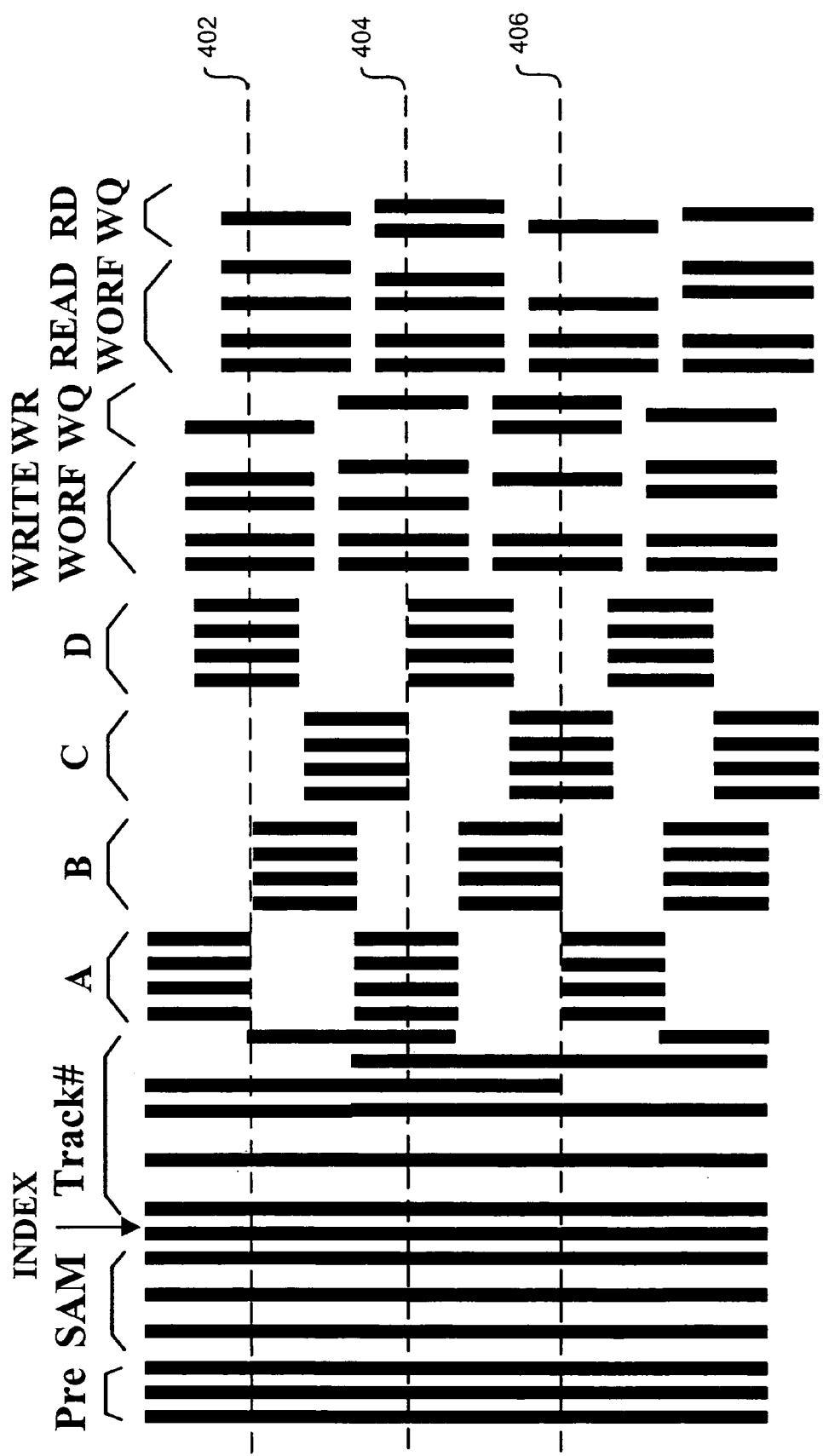
FIG. 7 is a diagram of a servo pattern containing WORF data and quadrant information for both a read and a write operation in accordance with one embodiment of the present invention.

FIG. 7 also shows an example in which quadrant information has been added to the WORF information for each data track. In FIG. 7, however, it can be seen that WORF data and WORF quadrant information is also written for a read operation. WORF data can be stored for both read and write operations, and can be stored in any order. WORF data in a wedge can also contain WORF information for subsequent wedges. While the WORF data for write operations may often be located at or near the radial position of a data track, the WORF data for read operations may be radially offset relative to a data track or servo track. If a read/write head is used that contains offset read and write elements, the radial separation between the elements will vary as the head sweeps across the surface of the disk. Therefore, the WORF offset can similarly vary radially across the disk.

Figure 8:
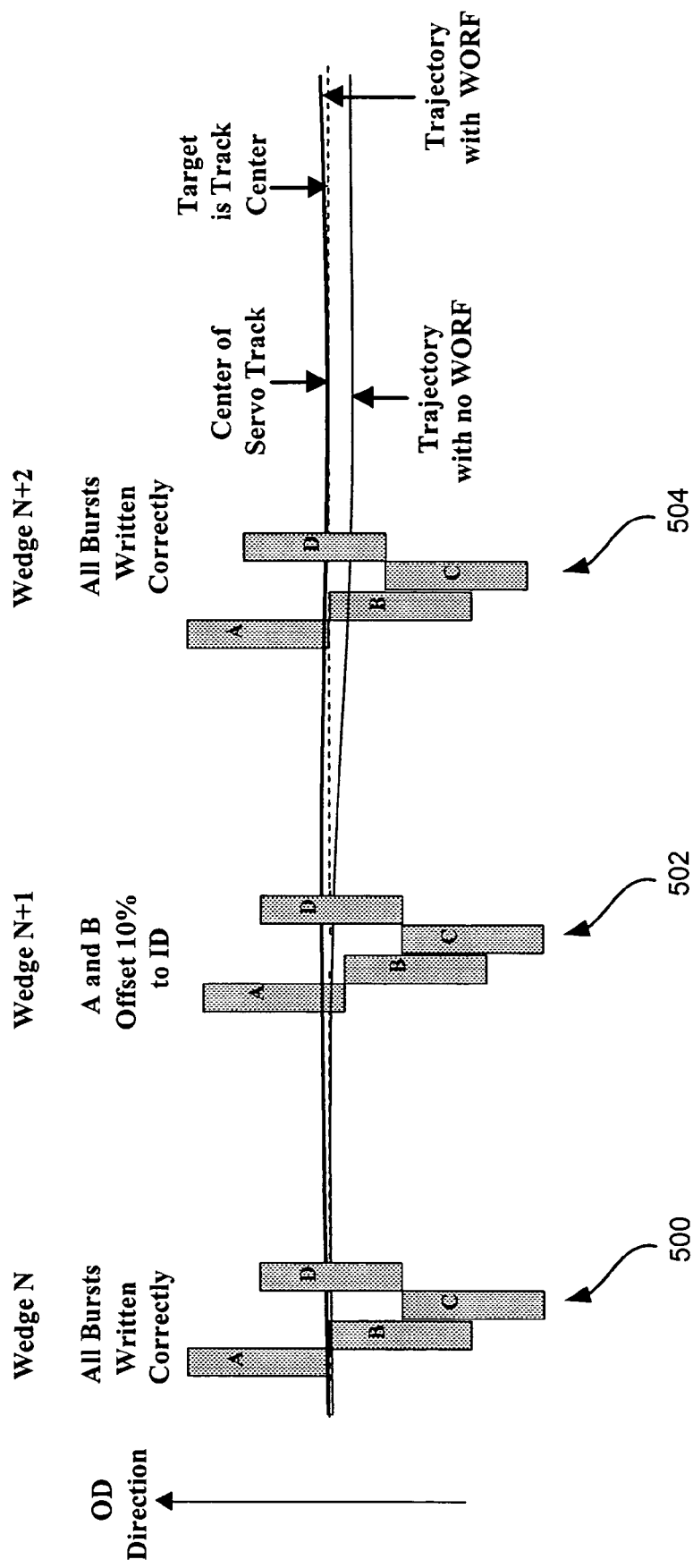
FIG. 8 is a diagram of servo bursts that can be used in accordance with an embodiment of the present invention.

FIG. 8 shows a burst pattern for three servo wedges 500, 502, 504 on a data track. The track centerline is defined by the A-burst/B-burst boundaries of each wedge. The trajectory of a head without the use of WORF information can be seen. For the burst pattern in wedge 500, the bursts are all written in approximately the correct location, such that a PES value of about zero would be read for the wedge. For wedge 502, the A-burst/B-burst boundary is misplaced by about 10% toward the ID. This could result in a PES value of about −10%. In order to account for the PES value, the trajectory of the head without the use of WORF information would then improperly be adjusted toward the ID. By wedge 504, even though the A-burst/B-burst boundary is written in approximately the correct location, the improper trajectory would cause a PES value of about 10% to be read.

In order to improve the trajectory of the head, the WORF information can be processed for each wedge. For wedge 500, the PES value of zero would correspond to a WORF value of zero, as the boundary was not misplaced. For wedge 502, the WORF value would take into account the 10% misplacement of the A/B boundary, such that when combined with the −10% PES value that would otherwise be calculated, the PES value would be about zero. It can be seen that the effect of wedge 502 on the trajectory is much more favorable when using the WORF value than without the WORF value. By the time the head gets to wedge 504, the WORF value is again zero because there is no misplacement, but there is also a PES value of zero because the trajectory of the head causes it to straddle the A/B boundary.

Figure 9:
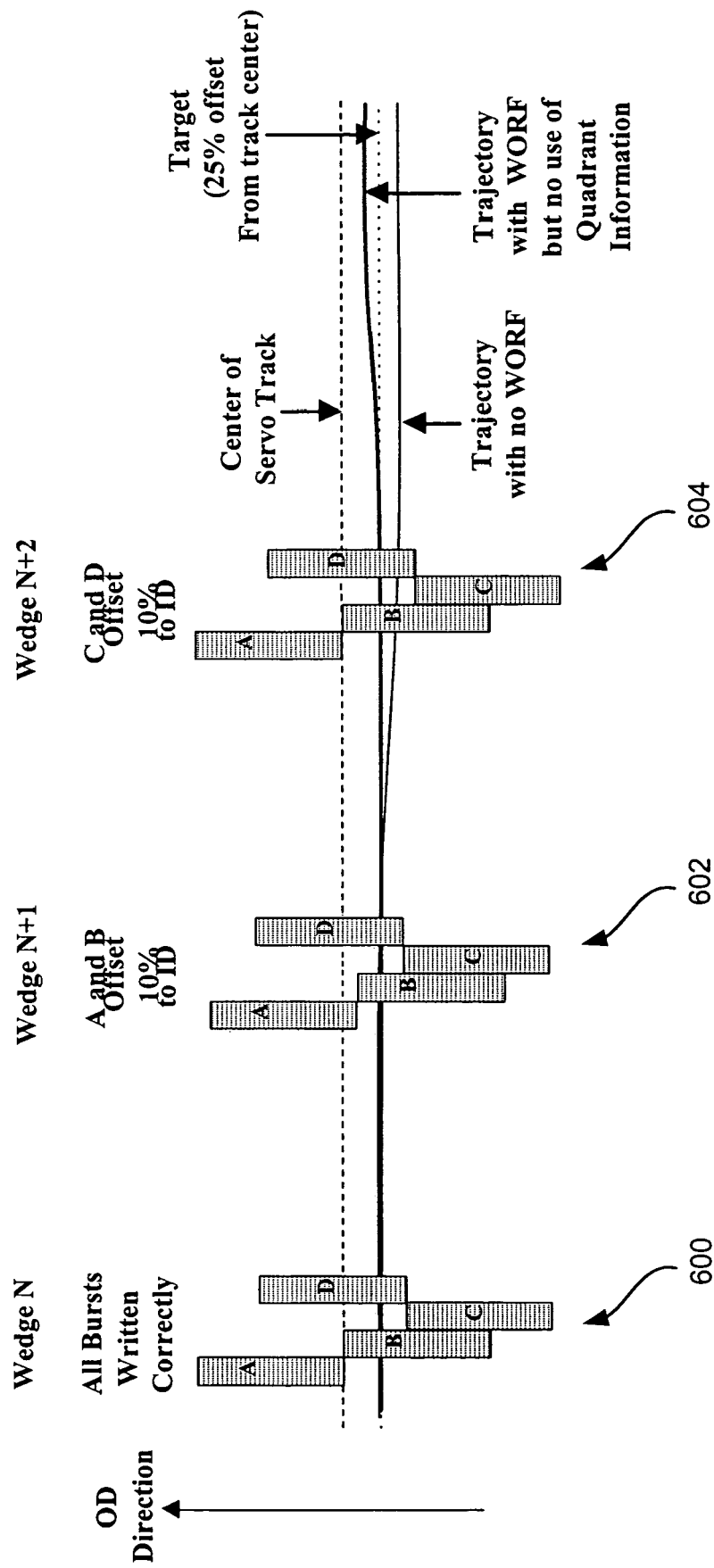
FIG. 9 is another diagram of servo bursts that can be used in accordance with an embodiment of the present invention.

FIG. 9 shows a similar pattern, except that the target position is 25% removed from track center. This can be due to a read/write offset that is a fraction of a data track. It can also be seen that there is no misplacement of bursts in wedge 600, but the A/B boundary is misplaced about 10% toward ID in wedge 602 and the C/D boundary is misplaced about 10% toward ID in wedge 604. As above, it can be seen that the trajectory without WORF is affected by the misplacement of wedge 602. The PES value that is then read for wedge 604 is about zero, such that the drive thinks the trajectory is along the target even though it is actually misplaced relative to the target.

WORF information could be used to correct the trajectory as in FIG. 7, but trajectory with WORF information is non-ideal in this case, because a WORF value calculated for the C/D burst quadrant in wedge 604 would have a value of about 10%. After using the WORF value for wedge 602, however, the trajectory of the head would no longer take the head closest to the C/D boundary in wedge 604, but closest to the A/B boundary. If the 10% WORF value is improperly applied to the A/B boundary, which is actually in about the correct place, the trajectory of the head will improperly be adjusted toward the OD of the disk. If, however, WORF quadrant information is used, such that the drive knows the WORF value is for the C/D quadrant, the WORF value will not be improperly applied to the A/B quadrant and the trajectory will be closer to the target.

Figure 10:
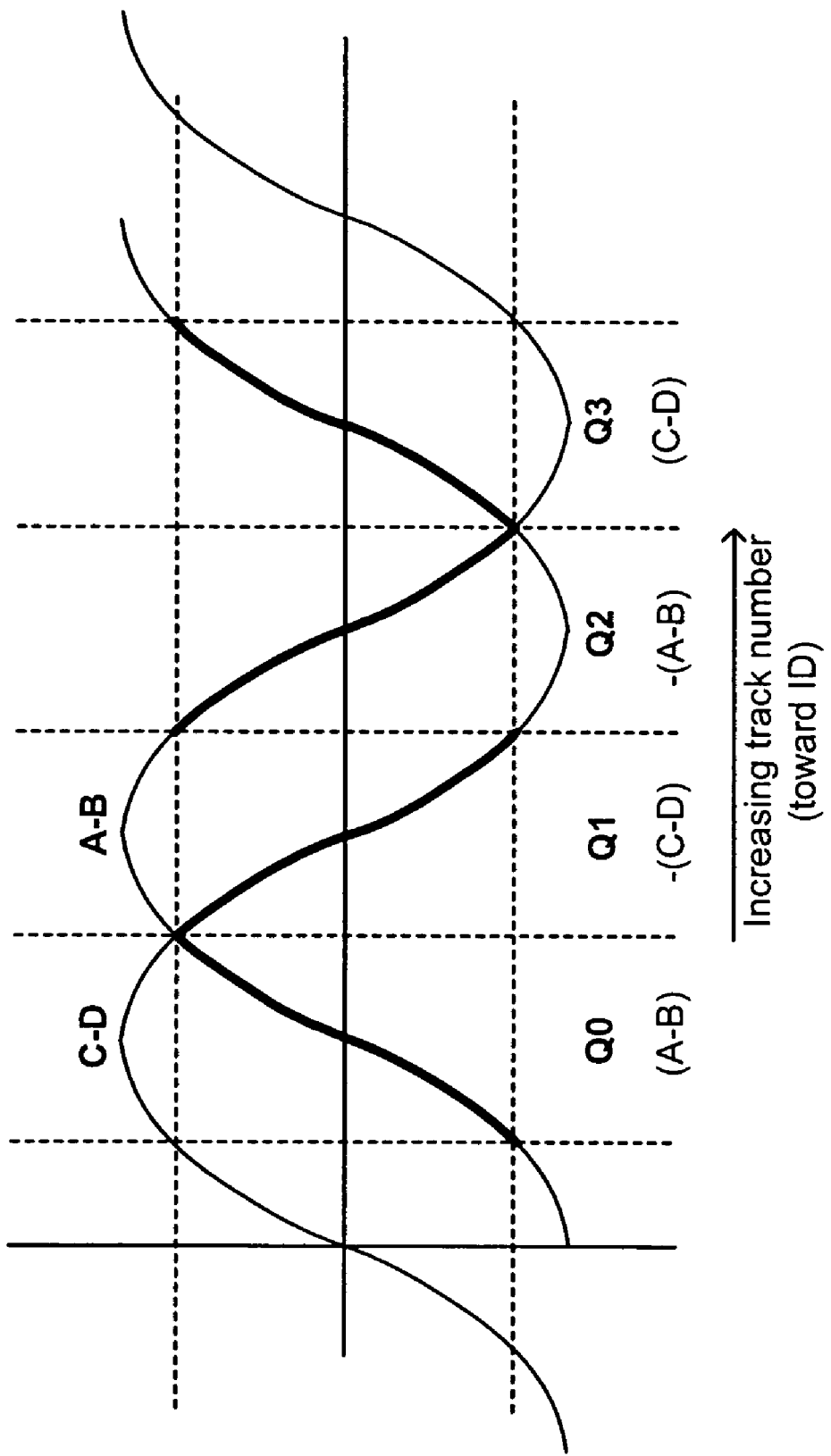
FIG. 10 is a chart showing quadrants in accordance with one embodiment of the present invention.

One way in which to determine the current quadrant is to examine the absolute magnitude of the boundaries. For example, FIG. 10 shows an example of a boundary curve for boundary pair A/B and boundary pair C/D. It can be seen that when the head is in Q0, the absolute value of A-B is smaller than the absolute value of C-D. Therefore, the head is either in Q0 or Q2. Since the sensed amplitude of C is greater than the sensed amplitude of D, then the head knows it is in Q0. Accordingly, the PES signal can be calculated from A-B. In quadrant 1, the absolute value of C-D is less than the absolute value of A-B. Therefore, the head is in either Q1 or Q3. Since the sensed amplitude of A is larger than the sensed amplitude of B, the head knows it is in Q1. When the absolute value of A-C and B-D are the same, a decision will need to be made as to which curve to use to record WORF values. As an alternative, when |A-C|=|B-D| WORF can be recorded for both boundaries.

Although embodiments described herein refer generally to systems having a read/write head that can be used to write bursts on rotating magnetic media, advantages of the present invention can be obtained for other media storage devices. For example, a laser writing information to an optical media can utilize WORF data and position information to account for irregularities in positioning information. Any media, or at least any rotating media, upon which information is written, placed, or stored, may be able to take advantage of embodiments of the invention, as variations in optical, electrical, magnetic, mechanical, and other physical systems can be made by varying a drive signal or other control mechanism in order to account for misplacement.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for adjusting the position of a head relative to a track on a rotatable storage medium, comprising:
   a rotatable medium including at least one surface having a servo pattern contained thereon, the servo pattern containing a plurality of concentric quadrants and a plurality of servo wedges;
   a positioning mechanism adapted to determine any misplacement of a portion of the servo pattern in one of the servo wedges, and the quadrant containing that portion; and
   a write mechanism adapted to write information regarding the misplacement and quadrant to the servo wedge containing that portion.

2. A system according to claim 1, wherein:
   the rotatable medium includes a servo pattern containing a plurality of servo bursts, and the portion of the servo pattern includes at least one burst.

3. A system according to claim 2, wherein:
   the rotatable medium includes a servo pattern containing a plurality of servo bursts, and the portion of the servo pattern includes a burst boundary.

4. A system according to claim 2, wherein:
   the rotatable medium includes a servo pattern containing a plurality of servo bursts, and the portion of the servo pattern includes a pair of servo bursts.

5. A system according to claim 1, further comprising:
   a head containing the write element.

6. A system according to claim 5, wherein:
   the head further contains a read element.

7. A system according to claim 5, wherein:
   the rotatable medium includes a servo pattern containing a plurality of servo boundaries, and each boundary is adapted to be used for positioning the head relative to the rotatable medium.

8. A system for determining servo pattern misplacements, comprising:
   a rotatable medium capable of storing information written to the rotatable medium;
   a read element capable of reading information from the rotatable medium;
   a write element capable of writing information to the rotatable medium; and
   a control mechanism in communication with the read element and write element, the control mechanism adapted to:
     determine any misplacement of a portion of a servo pattern on a rotating medium;
     identify a quadrant on the rotating medium containing the portion; and
     store information about the misplacement and the quadrant to be used in any of a read operation and write operation that determines position using that portion of the positioning pattern, such that the misplacement information is only used for that quadrant.

9. A system according to claim 8, further comprising:
   a servo controller adapted to determine the misplacement.

10. A system according to claim 8, wherein:
    the write element is further adapted to write information about the misplacement and quadrant to the quadrant on the rotating medium containing the positioning pattern.

11. A system for reducing written-in runout in a servo pattern on a magnetic hard disk, comprising:
    means for determining the misplacement of a servo burst pair on a rotating hard disk;
    means for identifying the quadrant containing the servo burst pair, the rotating hard disk having a plurality of quadrants extending radially across a surface of the disk; and
    means for storing information about the misplacement of the burst pair and the quadrant to be used in any of a read operation and write operation that determines position using that burst pair, such that the misplacement is only used for that quadrant.

12. A system for removing servo burst misplacement, comprising:
    a rotatable medium including at least one surface having a servo pattern contained thereon, the servo pattern containing a plurality of concentric quadrants and a plurality of tracks;
    a positioning mechanism adapted to determine any misplacement of a portion of the servo pattern relative to one of the tracks, and the quadrant containing that portion; and
    a write mechanism adapted to write information regarding the misplacement and quadrant to the track containing that portion.

* * * * *